United States Patent
Wang et al.

(10) Patent No.: US 11,392,245 B2
(45) Date of Patent: Jul. 19, 2022

(54) DATA DETECTION METHOD AND DEVICE, STORAGE MEDIUM AND TOUCH DEVICE

(71) Applicants: BEIJING BOE DISPLAY TECHNOLOGY CO., LTD., Beijing (CN); BOE TECHNOLOGY GROUP CO., LTD., Beijing (CN)

(72) Inventors: Jianting Wang, Beijing (CN); Zhanchang Bu, Beijing (CN); Rui Guo, Beijing (CN); Jianzi He, Beijing (CN); Zhiming Meng, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 236 days.

(21) Appl. No.: 16/619,828

(22) PCT Filed: Feb. 21, 2019

(86) PCT No.: PCT/CN2019/075720
§ 371 (c)(1),
(2) Date: Dec. 5, 2019

(87) PCT Pub. No.: WO2020/001042
PCT Pub. Date: Jan. 2, 2020

(65) Prior Publication Data
US 2021/0326023 A1    Oct. 21, 2021

(30) Foreign Application Priority Data
Jun. 29, 2018  (CN) .......................... 201810699397.6

(51) Int. Cl.
*G06F 3/045* (2006.01)
*G06F 3/041* (2006.01)
*G06F 3/044* (2006.01)

(52) U.S. Cl.
CPC ........ *G06F 3/04182* (2019.05); *G06F 3/0445* (2019.05); *G06F 3/0446* (2019.05);
(Continued)

(58) Field of Classification Search
CPC .. G06F 3/04182; G06F 3/0446; G06F 3/0445; G06F 3/041662; G06F 2203/04111
See application file for complete search history.

(56) References Cited

U.S. PATENT DOCUMENTS

2011/0221701 A1    9/2011   Zhang et al.
2013/0038573 A1    2/2013   Chang et al.
(Continued)

FOREIGN PATENT DOCUMENTS

CN    102722286 A    10/2012
CN    103049152 A    4/2013
(Continued)

OTHER PUBLICATIONS

First Office Action for Chinese Application No. 201810699397.6, dated May 7, 2020, 10 Pages.
(Continued)

*Primary Examiner* — Adam R. Giesy
(74) *Attorney, Agent, or Firm* — Brooks Kushman P.C.

(57) ABSTRACT

A data detection method and device, a storage medium and a touch device are provided. The data detection method includes: collecting a plurality of initial detection values corresponding to a same touch point; comparing the plurality of initial detection values with a dynamic threshold of the touch point, and retaining the initial detection values which meet requirements as detection retention values; and adjusting the dynamic threshold of the touch point according to the detection retention values, wherein the adjusted dynamic threshold is used for comparing with the initial detection value corresponding to the touch point which is collected
(Continued)

subsequently. The data detection method may adjust the dynamic threshold for touch points, and overcome an influence of environmental factors leading to a false detection.

20 Claims, 7 Drawing Sheets

(52) U.S. Cl.
CPC .................. *G06F 3/041662* (2019.05); *G06F 2203/04111* (2013.01)

(56) References Cited

U.S. PATENT DOCUMENTS

| | | | |
|---|---|---|---|
| 2013/0328823 | A1 | 12/2013 | Liu et al. |
| 2015/0081249 | A1 | 3/2015 | Ye |
| 2016/0077641 | A1* | 3/2016 | Gowreesunker .... G06F 3/04182 345/173 |
| 2017/0371484 | A1 | 12/2017 | Fleck et al. |

FOREIGN PATENT DOCUMENTS

| | | |
|---|---|---|
| CN | 104461136 A | 3/2015 |
| CN | 104679373 A | 6/2015 |
| CN | 105045426 A | 11/2015 |
| CN | 105302383 A | 2/2016 |
| CN | 105373253 A | 3/2016 |
| CN | 106527783 A | 3/2017 |
| CN | 106681553 A | 5/2017 |
| CN | 107239184 A | 10/2017 |
| CN | 107544690 A | 1/2018 |
| CN | 107624176 A | 1/2018 |
| CN | 107678594 A | 2/2018 |
| CN | 108073329 A | 5/2018 |

OTHER PUBLICATIONS

International Search Report and Written Opinion for Application No. PCT/CN2019/075720, dated May 29, 2019, 10 Pages.
Third Office Action for Chinese Application No. 201810699397.6, dated May 28, 2021, 12 Pages.
$2^{nd}$ Chinese Office Action, English Translation.
CN104679373A, English Abstract and Machine Translation.
CN105045426A, English Abstract and Machine Translation.
CN105302383A, English Abstract and Machine Translation.
CN105373253A, English Abstract and Machine Translation.
CN107624176A, English Abstract and Machine Translation.
Notification of Grant for Korean Application No. 10-2019-7036979, dated Aug. 30, 2021, 2 Pages.
Second Office Action for Chinese Application No. 201810699397.6, dated Dec. 28, 2020, 11 Pages.

* cited by examiner

DATA DETECTION METHOD AND DEVICE, STORAGE MEDIUM AND TOUCH DEVICE

CROSS-REFERENCE TO RELATED APPLICATIONS

This application is the U.S. national phase of PCT Application No. PCT/CN2019/075720 filed on Feb. 21, 2019, which claims priority to Chinese Patent Application No. 201810699397.6 filed on Jun. 29, 2018, which are incorporated herein by reference in their entireties.

TECHNICAL FIELD

The present disclosure relates to a data detection method and device, a storage medium and a touch device.

BACKGROUND

With development of technologies, touch screens have become more and more widely used, and gradually become one of the most convenient human interface devices. The touch screen usually implements touch operations through various touch sensor technologies with small signals, such as a capacitive touch, a resistive touch, a nano touch, an electromagnetic touch, and the like. The touch sensor technologies have advantages of a high precision, a fast response, and a large number of touch points. Therefore, the touch sensor technologies have been widely used in electronic products such as mobile phones, tablet computers, notebook computers, televisions, display devices, digital photo frames, and navigators.

SUMMARY

At least one embodiment of the present disclosure provides a data detection method, including: collecting a plurality of initial detection values corresponding to a same touch point; comparing the plurality of initial detection values with a dynamic threshold of the touch point, and retaining the initial detection values which meet requirements as detection retention values; and adjusting the dynamic threshold of the touch point according to the detection retention values, wherein the adjusted dynamic threshold is used for comparing with the initial detection value corresponding to the touch point which is collected subsequently.

For example, in the data detection method of at least one embodiment of the present disclosure, the comparing the plurality of initial detection values with the dynamic threshold of the touch point, and retaining the initial detection values which meet the requirements as the detection retention values, includes: determining the number of samples; and comparing the initial detection values with the dynamic threshold of the touch point, retaining and storing the initial detection values which meet the requirements as the detection retention values until the number of the detection retention values reaches the number of the samples.

For example, in the data detection method of at least one embodiment of the present disclosure, the adjusting the dynamic threshold of the touch point according to the plurality of detection retention values, includes: calculating an average value of the plurality of detection retention values; and adjusting the dynamic threshold of the touch point according to the average value.

For example, in the data detection method of at least one embodiment of the present disclosure, the adjusting the dynamic threshold of the touch point according to the average value, includes: taking a sum of the average value and a correction value as the adjusted dynamic threshold of the touch point.

For example, in the data detection method of at least one embodiment of the present disclosure, the adjusting the dynamic threshold of the touch point according to the detection retention values, includes: determining a preset calculation number; for each detection except the first one, calculating an average value of the detection retention value obtained in the current detection and an average value obtained from a previous calculation, until the number of the detection retention values to be calculated reaches the preset calculation number; and adjusting the dynamic threshold of the touch point according to the calculated average value.

For example, in the data detection method of at least one embodiment of the present disclosure, the adjusting the dynamic threshold of the touch point according to the calculated average value, includes: taking a sum of the calculated average value and a correction value as the adjusted dynamic threshold of the touch point.

For example, in the data detection method of at least one embodiment of the present disclosure, the average value includes an arithmetic mean, a geometric mean or a harmonic mean.

For example, in the data detection method of at least one embodiment of the present disclosure, the adjusting the dynamic threshold of the touch point according to the detection retention values, includes: calculating a median of the detection retention values; and adjusting the dynamic threshold of the touch point according to the median.

For example, in the data detection method of at least one embodiment of the present disclosure, the adjusting the dynamic threshold of the touch point according to the median, includes: taking a sum of the median and a correction value as the adjusted dynamic threshold of the touch point.

For example, in the data detection method of at least one embodiment of the present disclosure, the correction value is determined according to an empirical value, a variance, a standard deviation or a mean deviation.

For example, the data detection method of at least one embodiment of the present disclosure, prior to collecting the plurality of initial detection values corresponding to a same touch point, further includes: setting an initial threshold as the dynamic threshold value of the touch point.

For example, the data detection method of at least one embodiment of the present disclosure includes: after adjusting the dynamic threshold of the touch point, comparing the initial detection value corresponding to the touch point which is collected subsequently with the adjusted dynamic threshold, and performing a touch detection according to a comparison result.

At least one embodiment of the present disclosure provides a data detection device, includes: a collection unit, configured to collect a plurality of initial detection values corresponding to a same touch point; a comparison unit, configured to receive the plurality of initial detection values, compare the plurality of initial detection values with a dynamic threshold of the touch point, and retain the initial detection values which meet requirements as detection retention values; and an adjustment unit, configured to be coupled with the comparison unit, and adjust the dynamic threshold of the touch point according to the detection retention values.

At least one embodiment of the present disclosure provides a data detection device, including: a processor; a memory; and one or more computer programs, stored in the memory and executed by the processor, wherein the programs are executed by the processor to implement: collecting a plurality of initial detection values corresponding to a same touch point; comparing the plurality of initial detection values with a dynamic threshold of the touch point, and retaining the initial detection values which meet the requirements as the detection retention values; and adjusting the dynamic threshold of the touch point according to the detection retention values, wherein the adjusted dynamic threshold is used for comparing with the initial detection value corresponding to the touch point which is collected subsequently.

For example, in the data detection method of at least one embodiment of the present disclosure, the comparing the plurality of initial detection values with the dynamic threshold of the touch point, and retaining the initial detection values which meet the requirements as the detection retention values, includes: determining the number of samples; and comparing the initial detection values with the dynamic threshold of the touch point, retaining and storing the initial detection values which meet the requirements as the detection retention values until the number of the detection retention values reaches the number of the samples.

For example, in the data detection method of at least one embodiment of the present disclosure, the adjusting the dynamic threshold of the touch point according to the detection retention values, includes: calculating an average value of the plurality of detection retention values; and adjusting the dynamic threshold of the touch point according to the average value.

For example, in the data detection method of at least one embodiment of the present disclosure, the adjusting the dynamic threshold of the touch point according to the plurality of detection retention values, includes: determining a preset calculation number; for each detection except the first one, calculating an average value of the detection retention value obtained in the current detection and an average value obtained from a previous calculation, until the number of the detection retention values to be calculated reaches the preset calculation number; and adjusting the dynamic threshold of the touch point according to the calculated average value.

At least one embodiment of the present disclosure provides a storage medium stored thereon non-transitory computer readable instructions capable of being executed by a computer to implement the data detection method according to any one of the embodiments of the present disclosure.

At least one embodiment of the present disclosure provides a touch device, including the data detection device according to any one of the embodiments of the present disclosure.

For example, the touch device of at least one embodiment of the present disclosure further including a touch screen, wherein the touch screen includes a plurality of touch points and is coupled with the data detection device which adjusts the dynamic threshold of each touch point.

BRIEF DESCRIPTION OF THE DRAWINGS

In order to illustrate the technical solutions of the present disclosure in a clearer manner, the drawings desired for the present disclosure will be described hereinafter briefly. Obviously, the following drawings merely relate to some embodiments of the present disclosure, and do not constitute limitations to the present disclosure.

DETAILED DESCRIPTION

Figure 1:
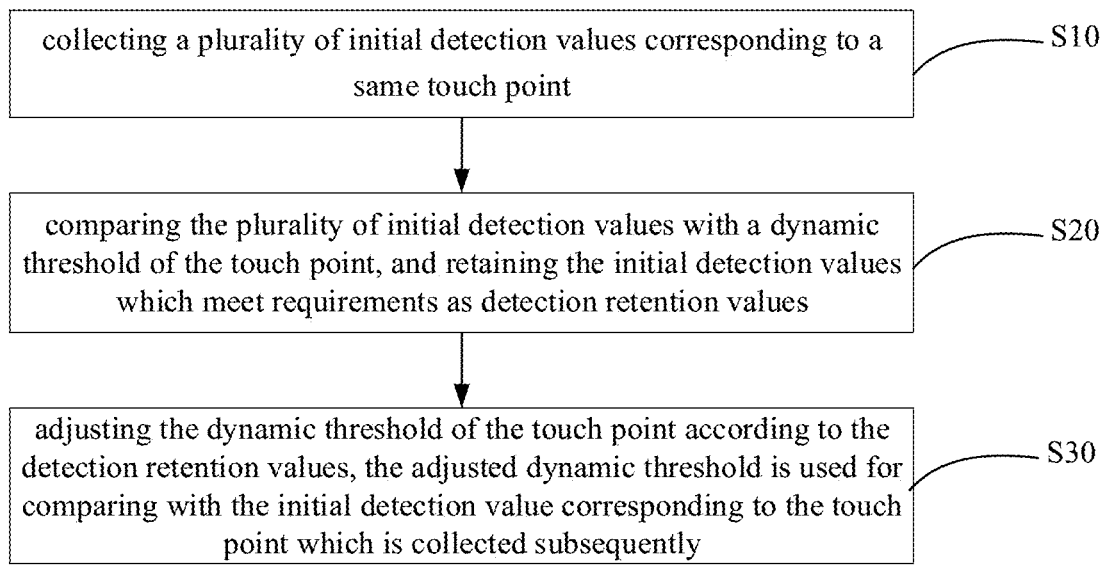
FIG. 1 is a schematic flow chart illustrating a data detection method according to one embodiment of the present disclosure.

In order to make an objective, a technical solution and an advantage of the present disclosure clearer, the technical solutions in the embodiments of the present disclosure will be described hereinafter clearly and completely with reference to the drawings of the embodiments of the present disclosure. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Unless otherwise defined, technical or scientific terms in the embodiments of the present disclosure shall be of general meanings understood by those skilled in the art. Terms "first", "second" and similar terms in the embodiments of the present disclosure do not indicate any order, quantity or importance, but are used only for distinguishing different components. Similarly, terms "one", "a" or "the" do not mean quantitative restrictions, but rather an existence of at least one. A term "include", "comprise" or another term with similar meaning indicates that components or objects listed before the term cover components, objects or other equivalents listed after the term, instead of excluding other components or objects. A term "connect" or other term with similar meaning is not limited to a physical connection or a mechanical connection, but may include an electrical connection, whether direct or indirect. "Up", "down", "left", "right" and so on are only used for representing a relative position relationship. When an absolute position of an object is changed, the relative position relationship may also change accordingly.

Currently, in a field of a touch interactive display, such as an electronic whiteboard, an interactive display integrated machine, a self-service machine, an interactive navigation, an interactive shopping guide, etc., a touch detection is generally implemented by a touch sensor. For example, the touch sensor detects and preprocesses signals of small changes in charges, voltages, currents, and the like. The preprocessing usually includes filtering, amplifying, and an analog-to-digital conversion (A/D conversion) on a small signal, which is generally implemented by an Active Front End (AFE) of a touch receiving channel. A data after the pre-processing is further processed in a control unit (for example, a microprocessor), and by comparing the data with a threshold, it is determined whether a touch is performed by a stylus or the like and coordinates of a position of the touch are determined.

The threshold is generally determined by writing a fixed value. For example, the fixed value (a threshold) to be written is usually determined according to characteristics of the touch sensor (such as impedance, distributed capacitance, a frequency, a magnetic field, etc.) or based on commissioning empirical values. If the threshold is set too large, a touch pressure required is increased, thereby reducing a touch experience; and if the threshold is set too small, false detections may be easily generated, which reduces a touch accuracy. Therefore, it is necessary to set the threshold reasonably according to actual situations. Once the threshold is determined, the threshold is written to a firmware (e.g., ROM) of a touch device and the threshold is no longer changed.

The small signal is very susceptible to an environment. When the environment changes, the small signal detected by the touch sensor is easily interfered by noises and fluctuates greatly. When the small signal interfered by the noises is compared with the threshold, it is easy to get a wrong comparison result, and the touch device is easy to give false detection. For example, structural stress changes in the touch device (such as changes in stress caused when a touch panel and a display module are attached) may cause a touch failure in a local area, and false detection is generated; when temperature or humidity changes, false detection may also be generated; effects of electromagnetic fields (such as static electricity) in different environments may also cause false detection.

Typically, false detection is eliminated by applying certain filtering technique in the active front end. However, the filtering technique, such as a frequency conversion filtering, a spatial filtering, a time filtering, or a background noise suppression, has a certain suppressing effect on random noises, and the suppressing effect is limited in environmental changes (changes in the structural stress, the temperature, the humidity, and an electromagnetic pollution) exist in a long time (the long time is relative to a touch scanning frequency), the background noise and a low-frequency noise. Meanwhile, a touch processing time is also increased, a touch delay is caused and thus the touch experience is reduced. In some touch devices, a single channel threshold setting method is used for separately setting a threshold for each channel. Differences between the channels are considered in this method and a yield rate of the touch device in a mass production is improved, but a problem of false detection caused by the environmental changes still remains.

At least one embodiment of the present disclosure provides a data detection method and device, a storage medium and a touch device. In some examples, the data detection method may adjust a dynamic threshold for touch points, overcome an influence of environmental factors leading to false detection, eliminate and improve the background noise, the low-frequency noise and a white noise to a certain extent, and have a certain environmental adaptive ability.

The embodiments of the present disclosure will be described below in detail with reference to the accompanying drawings. It should be appreciated that, a same reference sigh in different drawings is used for representing a same element described.

At least one embodiment of the present disclosure provides a data detection method, including: collecting a plurality of initial detection values corresponding to a same touch point; comparing the plurality of initial detection values with a dynamic threshold of the touch point, and retaining the initial detection values which meet requirements as detection retention values; and adjusting the dynamic threshold of the touch point according to the detection retention values, wherein the adjusted dynamic threshold is used for comparing with the initial detection value corresponding to the touch point which is collected subsequently.

FIG. 1 is a schematic flow chart illustrating a data detection method according to one embodiment of the present disclosure. Referring to FIG. 1, the data detection method may include the following steps S10~S30:

step S10: collecting a plurality of initial detection values corresponding to a same touch point;

step S20: comparing the plurality of initial detection values with a dynamic threshold of the touch point, and retaining the initial detection values which meet requirements as detection retention values; and step S30: adjusting the dynamic threshold of the touch point according to the detection retention values, the adjusted dynamic threshold is used for comparing with the initial detection value corresponding to the touch point which is collected subsequently.

For example, in step S10, for touch devices corresponding to different touch principles, the initial detection value may be a current, a voltage or any other forms of signal. For example, the data detection method may be applied to the touch device, and the touch point refers to a touch detection point in a touch screen of the touch device. For example, when the touch screen is of mutual capacitance type and includes two sets of electrodes arranged crosswise, the touch point refers to a crossing point of the two sets of electrodes. For example, in a touch detection, a scanning signal Tx is provided to one set of electrodes, and a sensing signal Rx of the other set of electrodes is collected to realize the touch detection. At this time, the initial detection value in step S10 may be the sensing signal Rx, and the plurality of initial detection values correspond to a plurality of sensing signals Rx collected for multiple times at a same touch point. Alternatively, the initial detection value in step S10 may also be a signal obtained after preprocessing (e.g., filtering, amplifying, A/D conversion, etc.) the sensing signal Rx.

For example, in step S20, the detection retention value may be stored and step S30 is performed after storing; or the detection retention value may be not stored and is directly used in step S30. For example, the dynamic threshold for comparison may be an initial threshold which is set in the touch device adopting the data detection method before leaving the factory. Or, the dynamic threshold for comparison may also be the dynamic threshold set and stored after a previous execution of the data detection method.

For example, when a difference between the initial detection value and the dynamic threshold is within a certain range, the initial detection value meets the requirements, and the initial detection value is retained as the detection retention value; when the difference between the initial detection value and the dynamic threshold exceeds the range, the initial detection value does not meet the requirements and is not retained as the detection retention value. For example, the certain range may be determined based on empirical values. For example, when the difference between the initial detection value and the dynamic threshold exceeds the certain range, it indicates that there may be a touch at the touch point corresponding to the initial detection value, so the initial detection value may be provided to a control unit set separately to determine whether there is the touch and coordinates of a position of the touch. For example, when the difference between the initial detection value and the dynamic threshold is within the certain range, it indicates that the touch point is not touched in general, and the difference between the initial detection value and the dynamic threshold may be caused by the environmental factors, such as changes in the structural stress, the temperature, the humidity, and the electromagnetic pollution. At this time, the initial detection value carries noise information. The initial detection value is retained as the detection retention value for subsequent steps, so that the noise information may be used for overcoming the interference to detection results.

For example, in step S30, the dynamic threshold of the touch point may be adjusted in various manners, for example, the dynamic threshold may be adjusted by using an average value, a median, or the like. As described above, the detection retention value carries the noise information, and the dynamic threshold is adjusted by using the detection retention value, so that the adjusted dynamic threshold also carries the noise information accordingly. When the adjusted dynamic threshold is used for comparing with the initial detection value which is collected subsequently, the noise information may be offset, thereby overcoming the influence of the environmental factors leading to false detection, eliminating and improving the background noise, the low-frequency noise and the white noise to a certain extent, and enabling the touch device adopting the data detection method to have an environmental adaptive ability.

It should be appreciated that, in the embodiment of the present disclosure, the data detection method may adjust the dynamic threshold for the touch point, and the dynamic threshold value of each touch point may be the same or different. For example, the dynamic threshold may be adjusted for each touch point or some touch points (for example, the touch point located in a center area of the touch screen) in the touch device to meet combined requirements of operation efficiency and accuracy in practical applications. Due to different degrees of environmental impact on the touch points, the data detection method fully considers the difference of the touch points, thereby the accuracy of the touch device adopting the data detection method is effectively improved, and occurrence of false detection may be reduced. For example, the data detection method may be realized by adding algorithm software in the control unit of the touch device, without changing a hardware structure of the touch device and setting of the active front end, so the data detection method may be applied to any type of touch devices in general.

It should be appreciated that, in the embodiment of the present disclosure, an execution order of steps S10, S20 and S30 is not limited and may be determined according to actual needs. For example, when steps S10, S20 or S30 include multiple sub steps, each step and sub step in the data detection method may be executed serially or in parallel, and the execution order is not limited. The data detection method may be executed according to needs, for example, the data detection method may be executed when the touch control device is turned on (powered on), it may also be executed in a predetermined time period after the touch control device is turned on, or it may be executed at any other time point or under certain conditions, which is not limited in the embodiments of the present disclosure. For example, when the data detection method is executed periodically, an execution period is much larger than a scanning period of the scanning signal Tx, such as a few minutes, dozens of minutes or hours, so the execution period barely has impact on the touch detection. For example, the data detection method may be executed once when needed, or multiple times to enable the dynamic threshold to be adjusted in real time according to the environmental changes.

Figure 2:
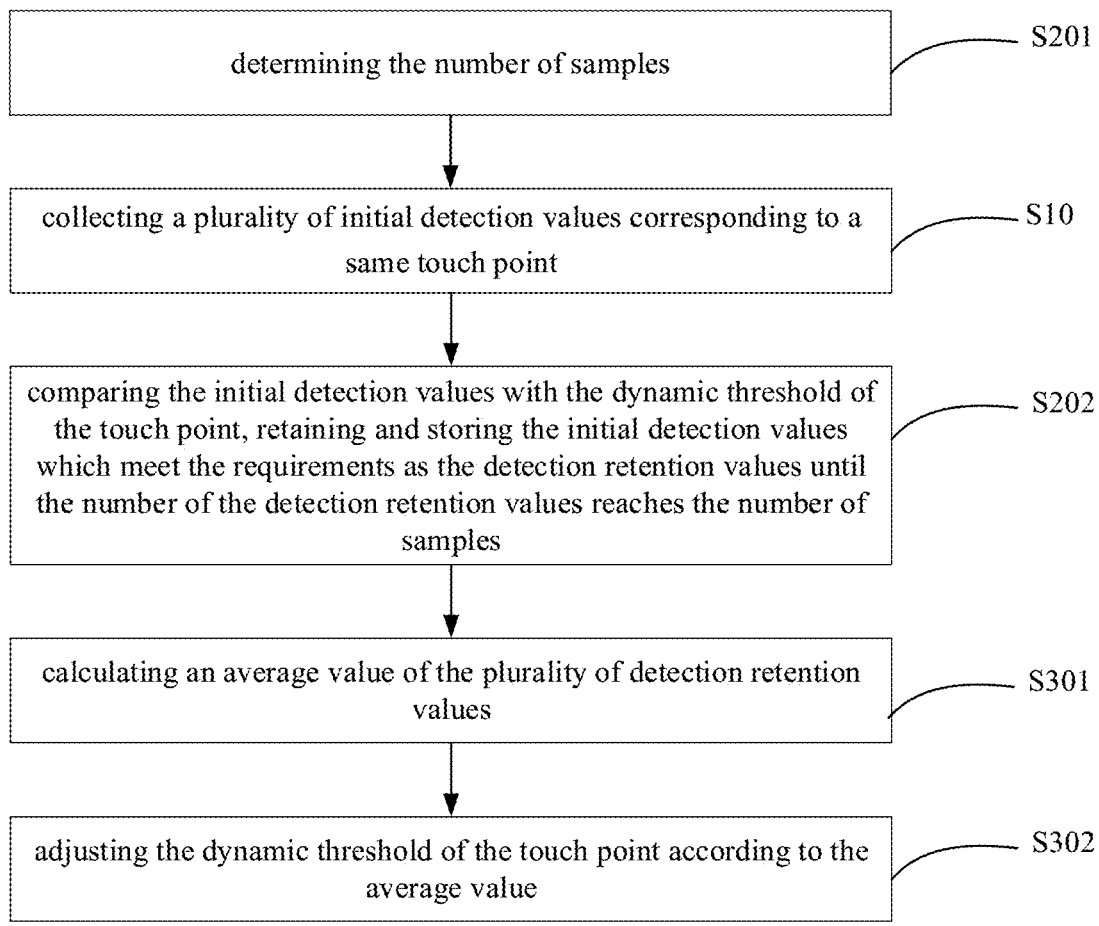
FIG. 2 is a specific flow chart illustrating a data detection method according to one embodiment of the present disclosure.

FIG. 2 is a specific flow chart illustrating a data detection method according to one embodiment of the present disclosure. Referring to FIG. 2, steps S201 and S202 correspond to step S20 of the data detection method shown in FIG. 1, and steps S301 and S302 correspond to step S30 of the data detection method shown in FIG. 1. The data detection method includes the following steps:

step S201: determining the number of samples;

step S10: collecting a plurality of initial detection values corresponding to a same touch point;

step S202: comparing the initial detection values with the dynamic threshold of the touch point, retaining and storing the initial detection values which meet the requirements as the detection retention values until the number of the detection retention values reaches the number of samples;

step S301: calculating an average value of the plurality of detection retention values;

step S302: adjusting the dynamic threshold of the touch point according to the average value.

For example, the above steps may be executed serially in an order shown in FIG. 2, but the embodiment of the present disclosure is not limited to this.

Firstly, the number of samples is determined. "The number of samples" refers to a number of the detection retention values. The number of samples may be determined according to computing power, storage space or other factors of the touch device. For example, in one example, the number of samples may be determined before the touch device leaves a factory. During a use of the touch device, each time the data detection method is executed, the number of samples remains the same, which is a value determined before the touch device leaving the factory. For example, in another example, the number of samples is determined before the execution of the data detection method, and the number of samples may be determined according to resource consumption of the touch device at this time, so that the number of samples may be dynamically adjusted according to operations of the touch device, without affecting other functions and performances of the touch device. For example, the number of samples may be one, two, or more. For example, when multiple samples are provided, the number of the detection retention values is equal to the number of samples.

Secondly, the plurality of initial detection values corresponding to the same touch point are collected. For example, the number of initial detection values may be larger than the number of samples, for example, the number of initial detection values is 10% or 20% more than the number of samples, so as to enable the number of detection retention values equal to the number of samples in subsequent step S202. Of course, the embodiment of the present disclosure is not limited to this, and the number of initial detection values may also be equal to or less than the number of samples. When the number of detection retention values obtained in the subsequent step S202 is less than the number of samples, step S10 may be returned to, to continue to collect the initial detection values. Detailed description of this step may refer to the relevant descriptions of step S10 of the data detection method shown in FIG. 1, which will not be repeated herein.

Thirdly, the initial detection values are compared with the dynamic threshold of the touch point, the initial detection values meeting the requirements are retained and stored as the detection retention values until the number of the detection retention values reaches the number of samples. For example, the storage space of the touch device (e.g., the memory) may be used for storing the plurality of detection retention values. The storage space may be a fixed storage space allocated by the touch device when the touch device is turned on, and the storage space is not used for storing other data, and is specially used for storing the detection retention values. Of course, the embodiment of the present disclosure is not limited to this. For example, the storage space may also be randomly allocated according to the number of samples when the data detection method is executed, and released to other functions or programs after the execution of the data detection method. For example, the storage space may be provided by using a storage of a plugin microprocessor, or the storage space may be provided by a way of separately setting the memory and the data may be written and read by a way of communication protocol transmission. For example, the number of stored detection retention values is equal to the number of samples, while the number of initial detection values may be larger than the number of samples. For example, a part of the initial detection values are stored as the detection retention values due to meeting the requirements, and the other part of the detection initial values which do not meet the requirements are provided to the control unit set separately to determine whether there is a touch and coordinates of the position of the touch.

Fourthly, the average value of the plurality of detection retention values is calculated. For example, the average value may include an arithmetic mean, a geometric mean, a harmonic mean or other applicable average values, etc., which is not limited by the embodiment of the present disclosure. For example, if the number of detection retention values is N (the number of samples is N), $A_1, A_2, \ldots, A_N$ indicates the plurality of detection retention values, the arithmetic mean $\overline{A_a}$ of the detection retention values may be expressed as:

$$\overline{A_a} = (A_1 + A_2 + \ldots + A_N)/N.$$

Similarly, the geometric mean $\overline{A_b}$ of the detection retention values may be expressed as:

$$\overline{A_b} = \sqrt[N]{A_1 \times A_2 \times \ldots \times A_N}.$$

The harmonic mean $\overline{A_c}$ of the detection retention values may be expressed as:

$$\overline{A_c} = N \bigg/ \left(\sum_{i=1}^{N} \frac{1}{A_i}\right)$$

Finally, the dynamic threshold of the touch points is adjusted according to the average value. For example, a sum of the calculated average value and a correction value is taken as the adjusted dynamic threshold of the touch point, that is, the adjusted dynamic threshold may be expressed as $M = \overline{A_a} + \Delta A$, $M = \overline{A_b} + \Delta A$, or $M = \overline{A_c} + \Delta A$, etc., M is the adjusted dynamic threshold and $\Delta A$ is the correction value. For example, the correction value may be determined according to an empirical value, a variance, a standard deviation or a mean deviation and other parameters obtained when calculating the average value. For example, the empirical value may be determined according to characteristics (impedance, mutual capacitance, self-capacitance, electromagnetic induction, etc.) of the touch device and a measured value. Of course, the embodiment of the present disclosure is not limited to this. For example, the correction value may be omitted, and the calculated average value may be directly used as the dynamic threshold of the touch point. In the embodiment of the present disclosure, the adjusted dynamic threshold may be used for comparing with the initial detection value newly collected corresponding to the touch point, and a real-time adjustment of the dynamic threshold may be realized, so as to overcome the influence of environmental factors leading to false detection.

Figure 3:
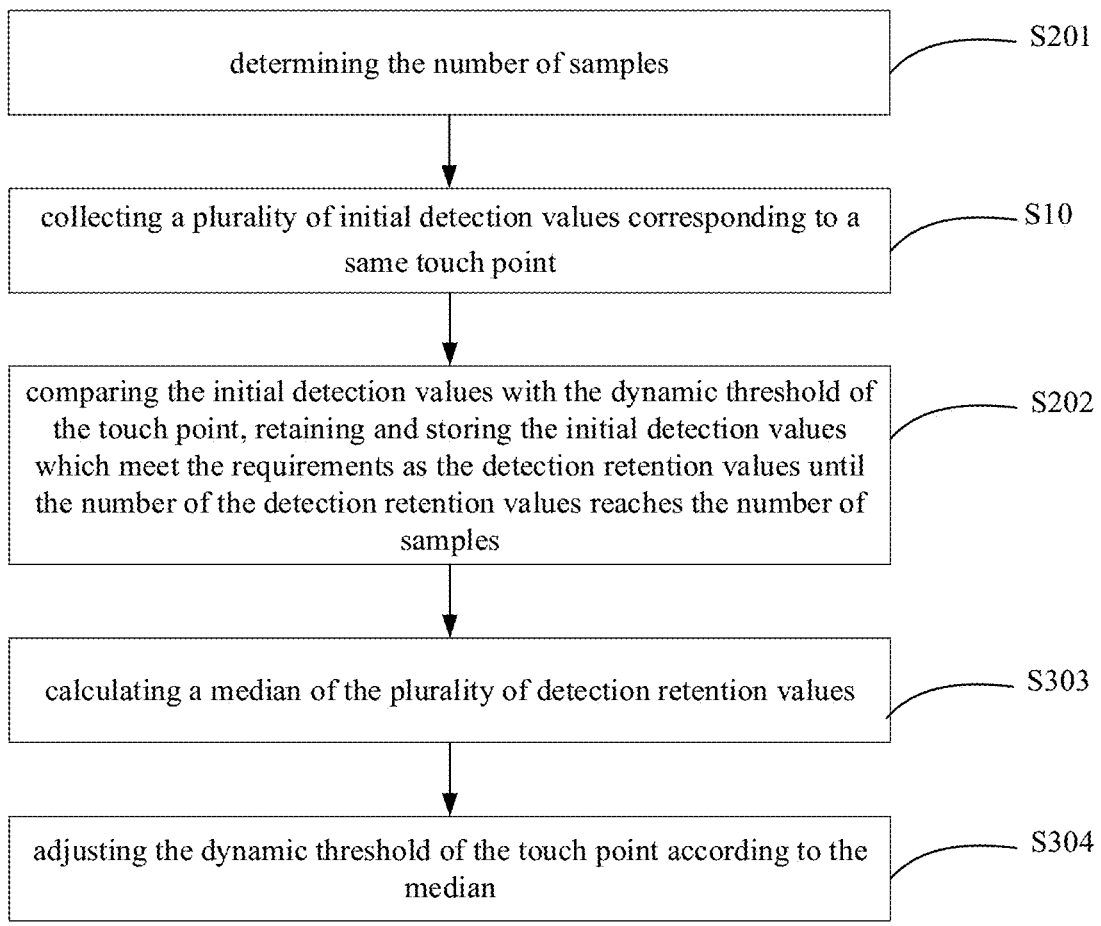
FIG. 3 is a specific flow chart illustrating another data detection method according to one embodiment of the present disclosure.

FIG. 3 is a specific flow chart illustrating another data detection method according to one embodiment of the present disclosure. Referring to FIG. 3, except for steps S303 and S304, the data detection method shown in FIG. 3 is substantially the same as the data detection method shown in FIG. 2. Steps S303 and S304 correspond to steps S30 of the data detection method shown in FIG. 1. In addition to steps S201, S10 and S202, the data detection method further includes steps S303-S304:

step S303: calculating a median of the plurality of detection retention values;

step S304: adjusting the dynamic threshold of the touch point according to the median.

For example, in step S303, the plurality of detection retention values are arranged into an array according to a numerical size, and a detection retention value in the middle of the array is taken as the median. For example, when a number of the detection retention values is even, an average value of the two detection retention values in the middle of the array may be used as the median. For example, the median may be a median of a normal distribution, a Poisson distribution or a binomial distribution, etc., which is not limited by the embodiment of the present disclosure.

For example, in step S304, a sum of the median and the correction value is taken as the adjusted dynamic threshold of the touch point. For example, the correction value may be determined according to an empirical value, a variance of the array, a standard deviation of the array or a mean deviation of the array and other parameters. For example, the empirical value may be determined according to characteristics (impedance, mutual capacitance, self-capacitance, electromagnetic induction, etc.) of the touch device and a measured value. Of course, the embodiment of the present disclosure is not limited to this. For example, the correction value may be omitted, and the calculated median may be directly used as the dynamic threshold of the touch point. In the embodiment of the present disclosure, the adjusted dynamic threshold may be used for the comparing with the initial detection value newly collected corresponding to the touch point, and a real-time adjustment of the dynamic threshold may be realized, so as to overcome the influence of environmental factors leading to false detection.

Figure 4:
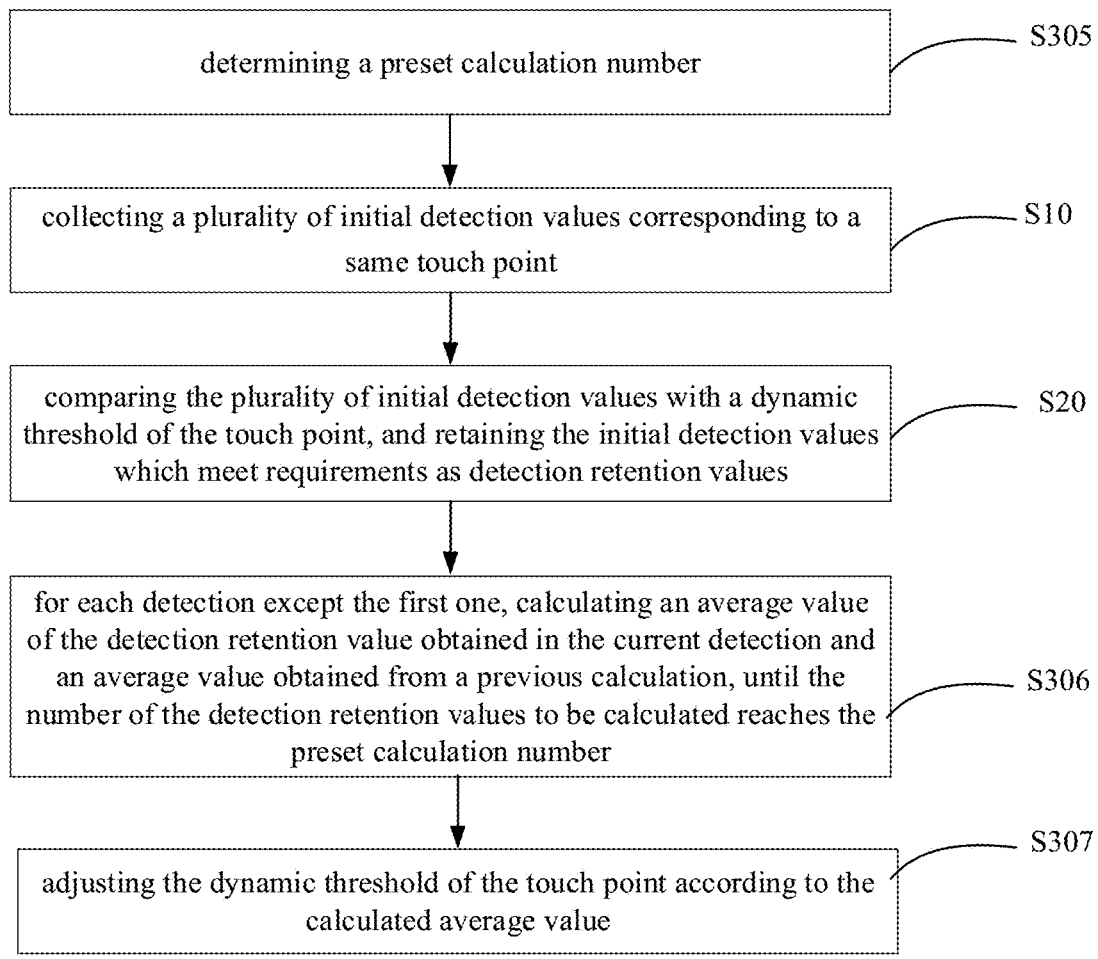
FIG. 4 is a specific flow chart illustrating still another data detection method according to one embodiment of the present disclosure.

FIG. 4 is a specific flow chart illustrating still another data detection method according to one embodiment of the present disclosure. Referring to FIG. 4, steps S305, S306 and S307 correspond to step S30 of the data detection method shown in FIG. 1. The data detection method includes the following steps:

step S305: determining a preset calculation number;

step S10: collecting a plurality of initial detection values corresponding to a same touch point;

step S20: comparing the plurality of initial detection values with a dynamic threshold of the touch point, and retaining the initial detection values which meet requirements as detection retention values;

step S306: for each detection except the first one, calculating an average value of the detection retention value obtained in the current detection and an average value obtained from a previous calculation, until the number of the detection retention values to be calculated reaches the preset calculation number;

step S307: adjusting the dynamic threshold of the touch point according to the calculated average value.

For example, in step S305, "the preset calculation number" refers to the number of the detection retention values in subsequent step S306. The preset calculation number may be determined according to storage space or other factors of the touch device. For example, in one example, the preset calculation number may be determined before the touch device leaves a factory. During a use of the touch device, each time the data detection method is executed, the preset calculation number remains the same, which is a value determined before the touch device leaving the factory. For example, in another example, the preset calculation number is determined before the execution of the data detection method, and the preset calculation number may be determined according to resource consumption of the touch device at this time, so that the preset calculation number may be dynamically adjusted according to operations of the touch device, without affecting other functions and performances of the touch device.

Step S10 and step S20 are substantially the same as step S10 and step S20 of the data detection method shown in FIG. 1, which will not be repeated herein. It should be appreciated that, in this embodiment, in step S10, after collecting the initial detection values, subsequent step S20 and/or step S306 is performed, and then step S10 is returned to, to continue to collect a next initial detection value depending on circumstances, and so on. In this embodiment, in step S20, the detection retention value is not stored, and the detection retention value obtained each time is directly used in the calculation of the subsequent step S306.

For example, in step S306, the average value may include an arithmetic mean, a geometric mean, a harmonic mean or other applicable average values, etc., which is not limited by the embodiment of the present disclosure. When the average value is the arithmetic mean, except for a first one, an average value of an average value obtained from a previous calculation and the detection retention value obtained in a current detection is calculated, a calculation formula may be expressed as:

$$\overline{A_d} = (\overline{A_d} \times (i-1))/i + A_i/i$$

$\overline{A_d}$ represents an arithmetic mean of a current calculation, $\overline{A_d}$ represents an arithmetic mean of a previous calculation, $A_i$ represents the detection retention value obtained in the current detection, i represents a number of the detection retention values to be calculated so far. For example, when a detection retention value $A_1$ is obtained in a first time, the calculation is not performed, a next detection is continued; when a detection retention value $A_2$ is obtained in a second time, the above formula is used for calculating the average value, and $\overline{A_d}$ is equal to the detection retention value $A_1$ obtained in the first time; when the detection retention value is obtained each time in future, the above formula is used for calculating the average value, $\overline{A_d}$ is the arithmetic mean of the previous calculation. When i is less than the preset calculation number, step S10 is returned to after each calculation to continue to collect the initial detection value and determine the detection retention values in step S20, and then the calculation is continued according to the above formula. After multiple calculations, when i reaches the preset calculation number, the calculation ends.

Similarly, when the average value is the geometric mean, the calculation formula may be expressed as:

$$\overline{A_e} = \sqrt[i]{\overline{A_e}^{(i-1)}} \times \sqrt[i]{A_i}$$

$\overline{A_e}$ represents a geometric mean of a current calculation, $\overline{A_e}$ represents a geometric mean of a previous calculation, $A_i$ represents the detection retention value obtained in the current detection, i represents the number of detection retention values to be calculated so far. After multiple calculations, when i reaches the preset calculation number, the calculation ends.

When the average value is the harmonic mean, the calculation formula may be expressed as:

$$\overline{A_f} = i/[(i-1)/\overline{A_f} + 1/A_i]$$

$\overline{A_f}$ represents a harmonic mean of a current calculation, $\overline{A_f}$ represents a harmonic mean of a previous calculation, $A_i$ represents the detection retention value obtained in the current detection, i represents the number of detection retention values to be calculated so far. After multiple calculations, when i reaches the preset calculation number, the calculation ends.

For example, in step S307, a sum of the calculated average value and a correction value is taken as the adjusted dynamic threshold of the touch point. For example, the correction value may be determined according to an empirical value, a variance, a standard deviation or a mean deviation and other parameters obtained when calculating the average value. For example, the empirical value may be determined according to characteristics (impedance, mutual capacitance, self-capacitance, electromagnetic induction, etc.) of the touch device and a measured value. Of course, the embodiment of the present disclosure is not limited to this. For example, the correction value may be omitted, and the calculated average value is directly used as the dynamic threshold of the touch point. In the embodiment of the present disclosure, the adjusted dynamic threshold may be used for the comparing with the initial detection value newly collected corresponding to the touch point, and a real-time adjustment of the dynamic threshold may be realized, so as to overcome the influence of environmental factors leading to false detection.

It should be appreciated that, in this embodiment, the detection retention value is directly used in the calculation of the average value, but is not stored after the calculation ends, so the storage space may be effectively saved. For example, the number of the touch points in the touch screen of the touch device is huge, and the number of detection retention values corresponding to each touch point is also huge. Therefore, if all detection retention values are stored and then calculated, a large storage space is required, and storage space requirements of the touch device are too much. The embodiment has less requirements for the storage space of the touch device, so that the data detection method is suitable for common touch devices.

Figure 5:
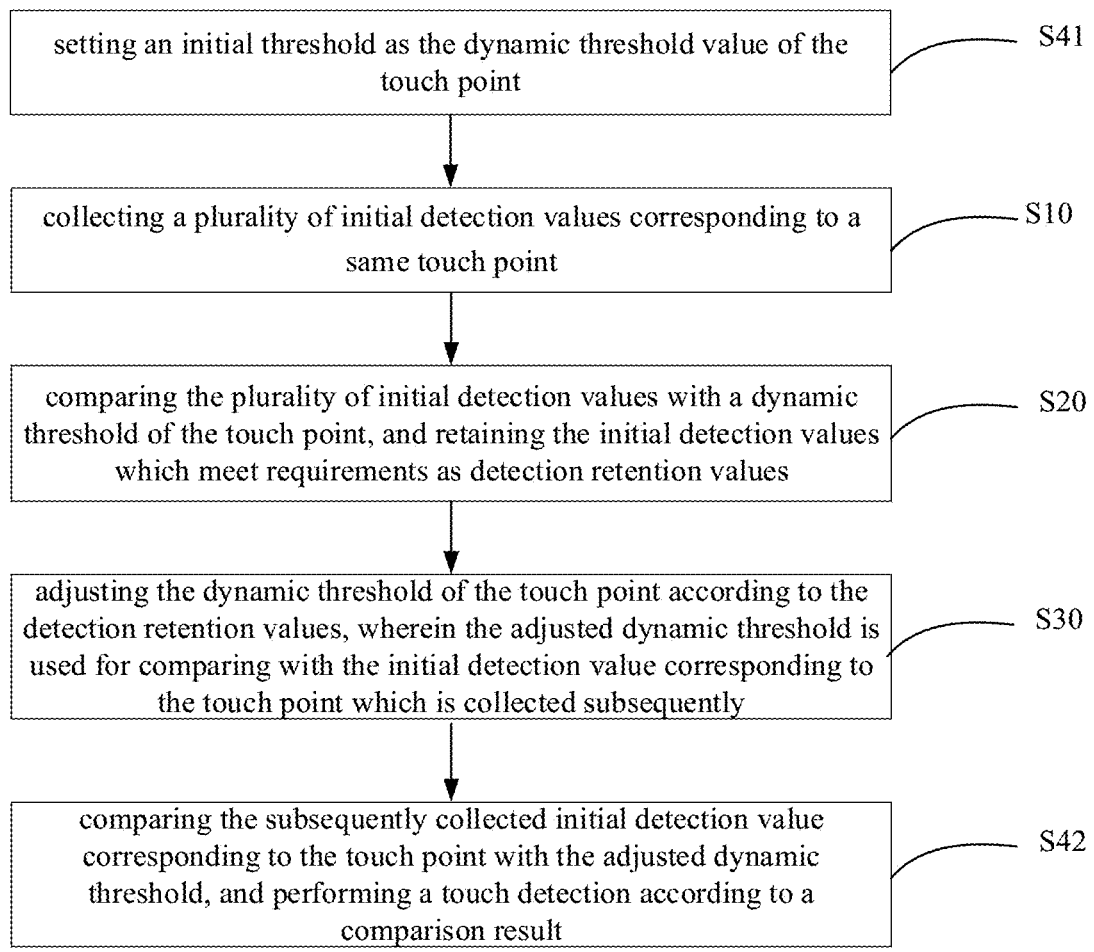
FIG. 5 is a specific flow chart illustrating yet still another data detection method according to one embodiment of the present disclosure.

FIG. 5 is a specific flow chart illustrating yet still another data detection method according to one embodiment of the present disclosure. Referring to FIG. 5, in addition to steps S10, S20 and S30, and steps S41 and S42 are further included, the data detection method is substantially the same as the data detection method described in FIG. 1.

For example, in one example, before performing step S10, step S41 is performed in which an initial threshold is set as the dynamic threshold value of the touch point. For example, the initial threshold may be a fixed value set in the touch device adopting the data detection method before leaving the factory, and the fixed value may be determined, for example, according to the characteristics of the touch device and test results. By setting the initial threshold as the dynamic threshold value of the touch point and performing the subsequent steps, influences of the adjusted dynamic threshold in a previous execution of the data detection method on a current detection result may be avoided when a current environment is quite different from an environment of the previous execution of the data detection method, so as to avoid errors of calculation results.

For example, in another example, after performing step S30, step S42 is performed where the initial detection value newly collected corresponding to the touch point is compared with the adjusted dynamic threshold, and a touch detection is performed according to a comparison result. For example, the adjusted dynamic threshold carries the noise information accordingly. When the initial detection values newly collected (collected after adjusting the dynamic threshold) are compared with the adjusted dynamic threshold, the noise information in the initial detection values may be offset. Thus, the comparison results may be more accurate and not affected by the noise. For example, when the difference between the initial detection value newly collected and the dynamic threshold exceeds the certain range, it indicates that there may be a touch at the touch point corresponding to the initial detection value, thereby coordinates of the touch position can be obtained according to coordinates of the touch point, and thus the touch detection is realized.

It should be appreciated that, in the embodiment of the present disclosure, the data detection method may also include more steps, which may be executed sequentially or in parallel. Although the data detection method described above includes multiple steps in a specific order, it should be clear that the order of the multiple steps is not limited.

At least one embodiment of the present disclosure provides a data detection device which may adjust the dynamic threshold for the touch points, overcome the influence of environmental factors leading to false detection, eliminate and improve the background noise, the low-frequency noise and the white noise to a certain extent, and have a certain environmental adaptive ability.

Figure 6:
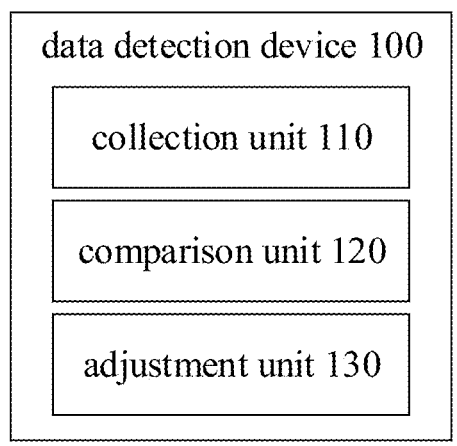
FIG. 6 is a schematic block diagram illustrating a data detection device according to one embodiment of the present disclosure.

FIG. 6 is a schematic block diagram illustrating a data detection device according to one embodiment of the present disclosure. Referring to FIG. 6, the data detection device 100 may include a collection unit 110, a comparison unit 120 and an adjustment unit 130. The collection unit 110 is configured to collect a plurality of initial detection values corresponding to a same touch point (such as one of multiple touch points). The comparison unit 120 is configured to receive the plurality of initial detection values, compare the plurality of initial detection values with a dynamic threshold of the touch point, and retain the initial detection values meeting requirements as the detection retention values. The adjustment unit 130 is configured to be coupled with the comparison unit 120, and adjust the dynamic threshold of the touch point according to the detection retention values. For example, there may be a plurality of detection retention values meeting the requirements, in this case, the comparison unit 120 provides the plurality of detection retention values to the adjustment unit 130.

As shown in FIG. 6, the collection unit 110 is coupled with the comparison unit 120, so the comparison unit 120 may receive the initial detection values provided by the collection unit 110; the comparison unit 120 is coupled with the adjustment unit 130, so the adjustment unit 130 may receive the detection retention values provided by the comparison unit 120, and adjust the dynamic threshold of the touch point according to the detection retention values.

For example, the comparison unit 120 is configured to determine the number of samples; compare the initial detection values with the dynamic threshold of the touch point, retain and store the initial detection values meeting the requirements as the detection retention values until the number of the detection retention values reaches the number of samples. Thus, the comparison unit 120 may retain the initial detection value meeting the requirements as the detection retention value.

In some examples, the adjustment unit 130 is configured to calculate an average value of the plurality of detection retention values; and adjust the dynamic threshold of the touch point according to the average value. Thus, the adjustment unit 130 may adjust the dynamic threshold of the touch point according to the average value of the plurality of detection retention values. For example, the adjustment unit 130 is configured to take a sum of the average value and a correction value as the adjusted dynamic threshold of the touch point, thus the adjustment unit 130 may adjust the dynamic threshold of the touch point according to the average value. For example, in the example, the average value includes an arithmetic mean, a geometric mean or a harmonic mean.

In some examples, the adjustment unit 130 is configured to adjust the dynamic threshold of the touch point according to the plurality of detection retention values through the following method: determining a preset calculation number; for each detection except the first one, calculating an average value of the detection retention value obtained in the current detection and an average value obtained from a previous calculation, until the number of the detection retention values to be calculated reaches the preset calculation number; and adjusting the dynamic threshold of the touch point according to the calculated average value. For example, the adjustment unit 130 is configured to take a sum of the calculated average value and a correction value as the adjusted dynamic threshold of the touch point, thus the adjustment unit 130 may adjust the dynamic threshold of the touch point according to the calculated average value. For example, in the example, the average value includes an arithmetic mean, a geometric mean or a harmonic mean.

In some examples, the adjustment unit 130 is configured to adjust the dynamic threshold of the touch point according to the plurality of detection retention values through the following method: calculating a median of the plurality of detection retention values; and adjusting the dynamic threshold of the touch point according to the median. For example, the adjustment unit 130 is configured to adjust the dynamic threshold of the touch point according to the median by taking a sum of the median and a correction value as the adjusted dynamic threshold of the touch point. For example, the correction value is determined according to an empirical value, a variance, a standard deviation or a mean deviation.

For example, the data detection device may further include an initial threshold determining unit configured to set the initial threshold as the dynamic threshold value of the touch point before collecting the plurality of initial detection values corresponding to the same touch point. For example, the dynamic threshold of the touch point is stored in the comparison unit, and the initial threshold determining unit is coupled with the comparison unit to set the initial threshold value as the dynamic threshold value of the touch point stored in the comparison unit.

For example, after adjusting the dynamic threshold of the touch point, the comparison unit is configured to compare the initial detection value corresponding to the touch point newly collected with the adjusted dynamic threshold, and perform a touch detection according to a comparison result.

For example, the data detection device 100 may be applied to any electronic device having a touch function. For example, the electronic devices may be smartphones, tablets, digital cameras, navigators, etc. For example, the data detection device 100 may also be an independent electronic device.

For example, the collection unit 110, the comparison unit 120, the adjustment unit 130, and the initial threshold determining unit may be hardware, software, firmware, and any feasible combination of them. For example, the collection unit 110, the comparison unit 120, the adjustment unit 130 and the initial threshold determining unit may be a dedicated circuit or a general circuit, a chip or a device, or a combination of a processor and a memory. The embodiments of the present disclosure do not limit the specific implementation forms of the collection unit 110, the comparison unit 120, and the adjustment unit 130.

It should be appreciated that, in the embodiment of the present disclosure, each unit of the data detection device 100 corresponds to each step of the foregoing data detection method. Specific functions of the data detection device 100 may refer to the relevant description in the data detection method, which will not be repeated herein. The components and structures of the data detection device 100 shown in FIG. 6 are only exemplary, and non-restrictive, and the data detection device 100 may further include other components and structures as required.

Figure 7:
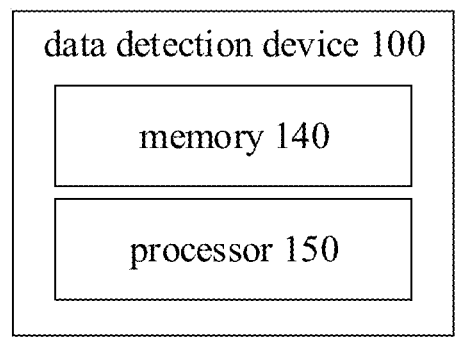
FIG. 7 is a schematic block diagram illustrating another data detection device according to one embodiment of the present disclosure.

FIG. 7 is a schematic block diagram illustrating another data detection device according to one embodiment of the present disclosure. Referring to FIG. 7, the data detection device 100 may include a memory 140 and a processor 150. The memory 140 is configured to store non-transitory computer readable instructions (e.g., one or more computer programs). The processor 150 is configured to execute non-transitory computer readable instructions. When the non-transitory computer readable instructions are executed by the processor 150, one or more of the steps of the data detection methods described above may be performed. The memory 140 and processor 150 may be interconnected by a bus system and/or other forms of connection mechanism (not shown).

For example, the processor 150 may be a Central Processing Unit (CPU), a Digital Signal Processor (DSP), or other forms of processing units having data processing capabilities and/or program execution capabilities, such as a Field Programmable Gate Array (FPGA) or the like; For example, the Central Processing Unit (CPU) may be an X86 or ARM architecture or the like. The processor 150 may be a general processor or a special processor that may control other components in the data detection device 100 to perform desired functions.

For example, the memory 140 may include any combination of one or more computer program products which may include various forms of computer readable storage medium, such as a volatile memory and/or a non-volatile memory. The volatile memory may include, for example, a Random Access Memory (RAM) and/or a cache. The volatile memory may include, for example, a Read-Only Memory (ROM), a hard disk, an Erasable Programmable Read-Only Memory (EPROM), a Compact Disk Read-Only Memory (CD-ROM), a USB memory, a flash memory, and the like. One or more computer readable programs may be stored in the computer readable storage medium, the processor 150 is configured to execute the one or more computer readable programs, to realize various functions of the data detection device 100. In the computer-readable storage medium, various applications and various data as well as various data used and/or generated by applications may also be stored.

It should be appreciated that, in the embodiments of the present disclosure, the specific functions of the data detection device 100 may refer to the relevant description in the data detection method, which will not be repeated herein.

At least one embodiment of the present disclosure provides a storage medium on which non-transitory computer readable instructions are stored, the instructions are capable of being executed by a computer to implement the data detection method according to any one of the embodiments of the present disclosure. The data detection method may be performed by using the storage medium, the dynamic threshold may be adjusted for the touch point, the influence of environmental factors leading to false detection can be overcome, the background noise, the low-frequency noise and the white noise may be eliminated and improved to a certain extent, and the environment adaptive ability may be achieved.

Figure 8:
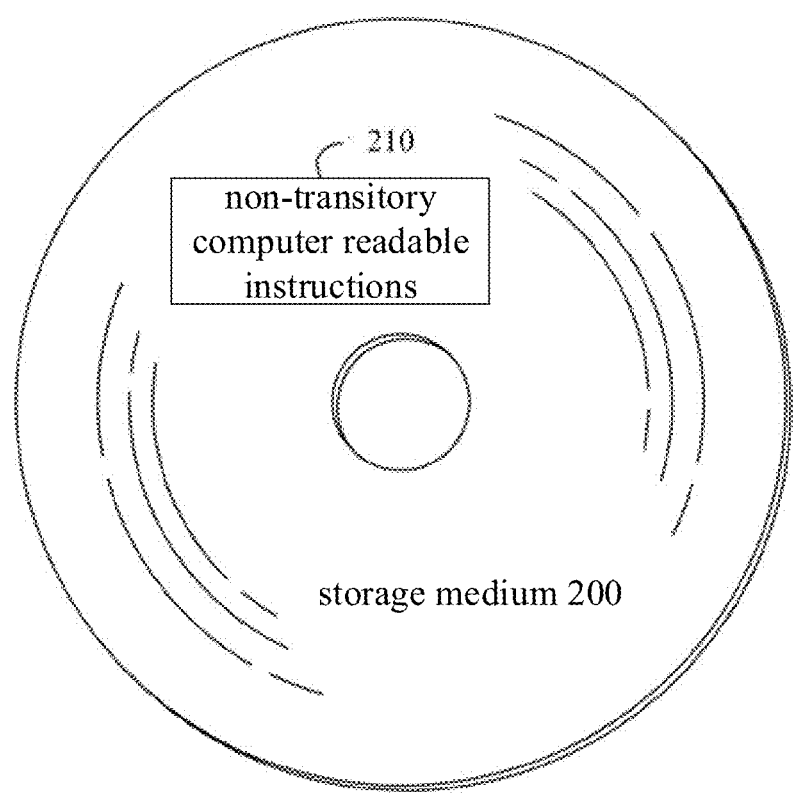
FIG. 8 is a schematic diagram illustrating a storage medium according to one embodiment of the present disclosure.

FIG. 8 is a schematic diagram illustrating a storage medium according to one embodiment of the present disclosure. Referring to FIG. 8, the storage medium 200 is used for storing non-transitory computer-readable instructions 210. For example, when the non-transitory computer-readable instructions 210 are executed by a computer, one or more steps of the data detection method described above can be performed.

For example, the storage medium 200 may be applied to the data detection device 100. For example, the storage medium 200 may be the memory 140 in the data detection device 100 shown in FIG. 7.

For example, the relevant description of the storage medium 200 may refer to the corresponding description of the memory 140 in the data detection device 100 shown in FIG. 7, which will not be repeated herein.

At least one embodiment of the present disclosure provides a touch device, including the data detection device according to any one of the embodiments of the present disclosure. The touch device may adjust the dynamic threshold for the touch points, overcome the influence of environmental factors leading to false detection, eliminate and improve the background noise, the low-frequency noise and the white noise to a certain extent, and have an environmental adaptive ability.

Figure 9:
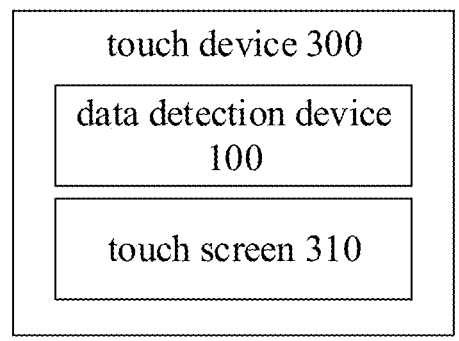
FIG. 9 is a schematic block diagram illustrating a touch device according to one embodiment of the present disclosure.

FIG. 9 is a schematic block diagram illustrating a touch device according to one embodiment of the present disclosure. Referring to FIG. 9, the touch device 300 includes the data detection device 100 and a touch screen 310. For example, the data detection device 100 is the data detection device according to any embodiment of the present disclosure. The touch screen 310 includes a plurality of touch points and is coupled with the data detection device 100 which adjusts the dynamic threshold value of each touch point. It should be appreciated that, the coupling of the touch points and the data detection device 100 means that a signal or an energy may be exchanged between the touch points and the data detection device 100. For example, an electrical signal (such as a touch sensing signal) generated by a touch point may be transmitted from the touch point to the data detection device 100. For example, the touch point may be coupled with the data detection device 100 via a physical connection (such as a connecting wire), and two ends of the connecting wire may be directly electrically connected with the touch point and the data detection device 100 respectively, for example; for example, the touch point may also be coupled with the data detection device 100 via a contactless connection (such as an electromagnetic wave) or other applicable methods. For example, the electromagnetic wave may be a radio wave (such as Bluetooth, WiFi), a microwave, an infrared ray, visible light or an ultraviolet ray. For example, the term "couple" used in other examples of the embodiments of the present disclosure has a similar definition and will not be repeated.

The touch device 300 may be any product or component with a touch function, such as an e-book, a tablet computer, a notebook computer, a game machine, a display, a digital photo frame, a navigator, etc., which is not limited by the embodiments of the present disclosure.

Figure 10:
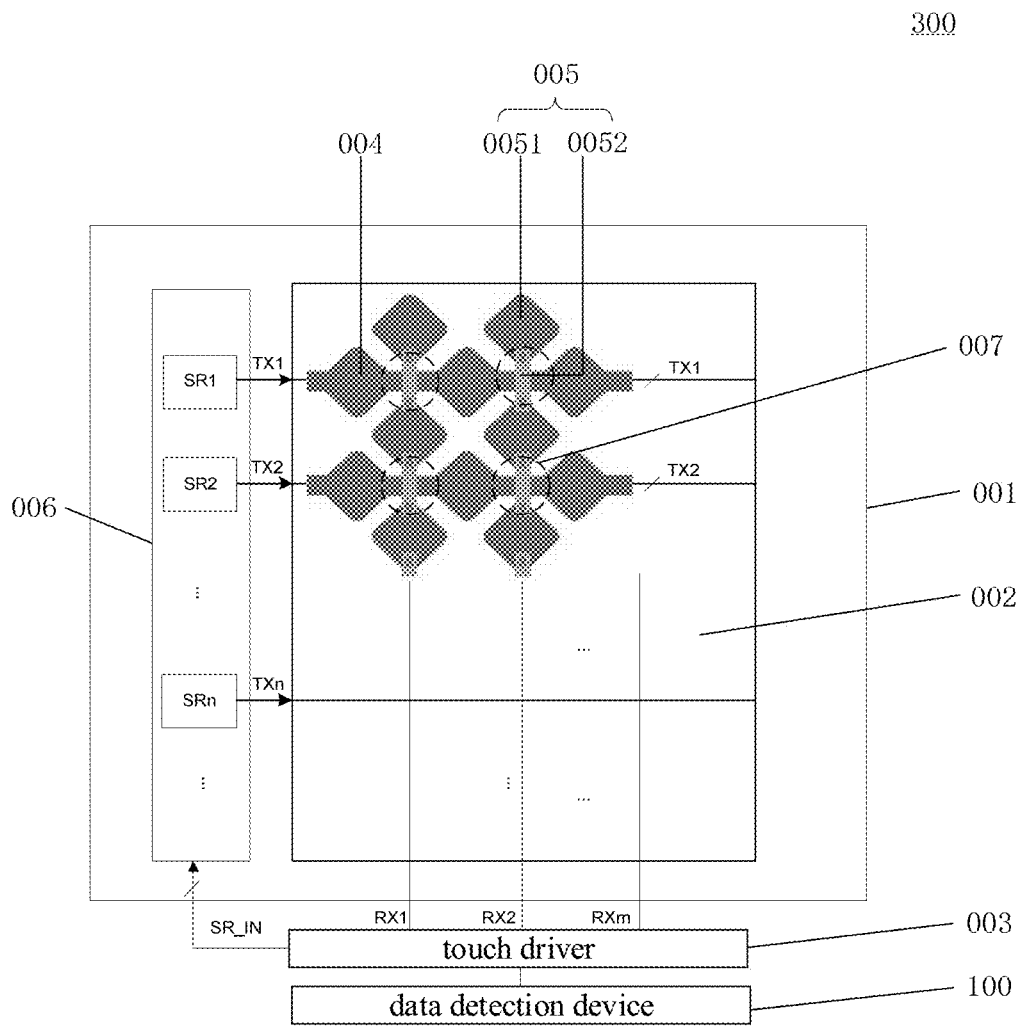
FIG. 10 is a schematic block diagram illustrating another touch device according to one embodiment of the present disclosure.

FIG. 10 is a schematic block diagram illustrating another touch device according to one embodiment of the present disclosure. Referring to FIG. 10, the touch device 300 includes a touch panel 001, a touch scanning electrode 004, a touch sensing electrode 005, a touch driver 003, a touch shift register circuit 006 and the data detection device 100.

The touch scanning electrode 004 and the touch sensing electrode 005 are insulated from each other and are arranged in an effective touch area 002 of the touch panel 001 (for example, the area for sensing touch operations of the touch panel 001). For example, the touch sensing electrode 005 includes a plurality of first electrodes 0051 and a plurality of second electrodes 0052, while the touch scanning electrode 004 extends continuously. The first electrodes 0051 are located on a same layer with the touch scanning electrode 004. The second electrodes 0052 are located at a different layer and are connected with a bridging part of an adjacent first electrode 0051 through a via hole, so that the touch sensing electrode 005 passes over the touch scanning electrode 004 crossed with the touch sensing electrode 005. For example, a cross part of the touch scanning electrode 004 and the touch sensing electrode 005 is a touch point 007. The aforementioned data detection method may adjust the dynamic threshold of each touch point 007, or adjust the dynamic threshold of some of the touch points 007.

The touch shift register circuit 006 includes a plurality of cascaded sub circuits (shift register units) SRn (n≥1) the plurality of sub circuits SRn are one-to-one corresponding to and electrically connected with a plurality of touch scanning electrodes 004 arranged in parallel with each other, so as to successively provide a scanning signal TXn (n≥1) to the plurality of touch scanning electrodes 004 during operation, for example, in a row-by-row scanning manner.

The touch driver 003 may be electrically connected with the touch shift register circuit 006 and the touch sensing electrode 005, for example, through a flexible printed circuit board or the like. The touch driver 003 is configured to control the touch panel 001 to perform a touch detection. For example, the touch shift register circuit 006 is provided with a shift trigger signal SR_IN, and a plurality of sensing signals RXm (m≥1) of the touch sensing electrodes 005 are collected. The touch driver 003 may also include a processing circuit for determining coordinates of a touch position in the touch effective area 002 according to the sensing signal RXm.

The data detection device 100 is the data detection device according to any embodiment of the present disclosure for adjusting the dynamic threshold of the touch point 007. For example, the data detection device 100 is electrically connected with the touch driver 003 to receive the plurality of sensing signals RXm through the touch driver 003, and provides the adjusted dynamic threshold to the touch driver 003. For example, the data detection device 100 may be a component independent from the touch driver 003 or integrated with the touch driver 003, which is not limited by the embodiments of the present disclosure. Detailed descriptions of the data detection device 100 may refer to the foregoing descriptions, and will not be repeated herein.

At least one embodiment of the present disclosure further provides a threshold setting method, by using the threshold setting method, the dynamic threshold may be adjusted for the touch point, the influence of environmental factors leading to false detection may be overcome, the background noise, the low-frequency noise and the white noise may be eliminated and improved to a certain extent, and the environment adaptive ability may be achieved.

Figure 11:
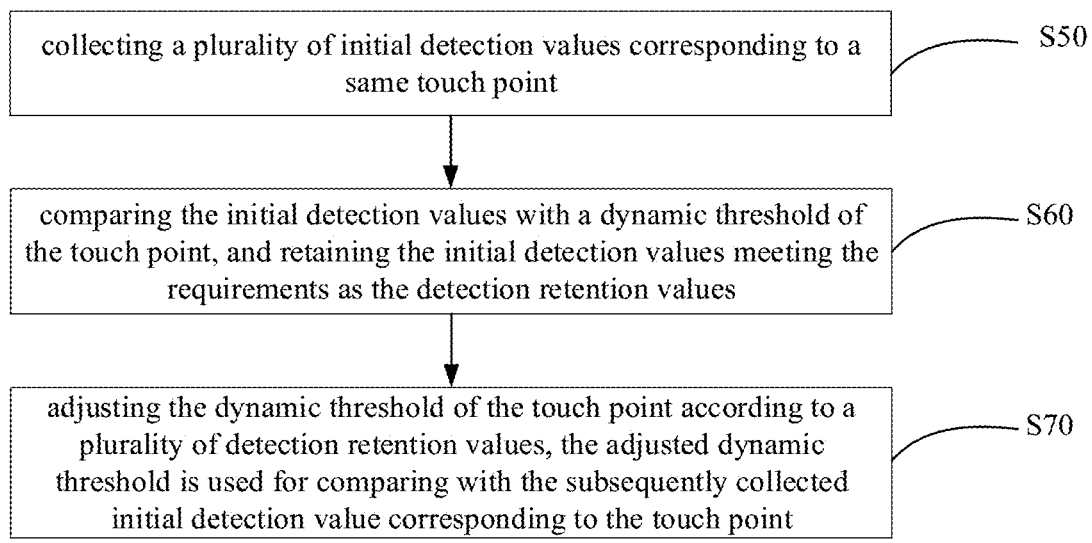
FIG. 11 is a schematic flow chart illustrating a threshold setting method according to one embodiment of the present disclosure.

FIG. 11 is a schematic flow chart illustrating a threshold setting method according to one embodiment of the present disclosure. As shown in FIG. 11, the threshold setting method may include the following steps:

step S50: collecting a plurality of initial detection values corresponding to a same touch point;

step S60: comparing the initial detection values with the dynamic threshold of the touch point, and retaining the initial detection values which meet the requirements as the detection retention values; and step S70: adjusting the dynamic threshold of the touch point according to a plurality of detection retention values, wherein the adjusted dynamic threshold is used for comparing with the initial detection value corresponding to the touch point which is collected subsequently.

Detailed descriptions of the threshold setting method may refer to the descriptions of the data detection method in the related embodiments, which is not repeated herein.

Several points should be explained:

(1) The drawings of the embodiments of the present disclosure relate only to structures involved in the embodiments of the present disclosure, and other structures may refer to general designs.

(2) The embodiments of the present disclosure and features in the embodiments may be combined with each other to obtain new embodiments without conflict.

The above are merely embodiments of the present disclosure, but a protection scope of the present disclosure is not limited thereto. The protection scope of the present disclosure shall be subject to the protection scope of the claims.

What is claimed is:
1. A data detection method, comprising:
collecting a plurality of initial detection values corresponding to a same touch point;
comparing the plurality of initial detection values with a dynamic threshold of the touch point, and retaining the initial detection values which meet requirements as detection retention values; and adjusting the dynamic threshold of the touch point according to the detection retention values, wherein the adjusted dynamic threshold is used for comparing with the initial detection value corresponding to the touch point which is collected subsequently.

2. The data detection method according to claim 1, wherein the comparing the plurality of initial detection values with the dynamic threshold of the touch point, and retaining the initial detection values which meet the requirements as the detection retention values, comprises:

determining the number of samples; and comparing the initial detection values with the dynamic threshold of the touch point, retaining and storing the initial detection values which meet the requirements as the detection retention values until the number of the detection retention values reaches the number of the samples.

3. The data detection method according to claim 1, wherein the adjusting the dynamic threshold of the touch point according to the detection retention values, comprises:

calculating an average value of the plurality of detection retention values; and adjusting the dynamic threshold of the touch point according to the average value.

4. The data detection method according to claim 3, wherein the adjusting the dynamic threshold of the touch point according to the average value, comprises:

taking a sum of the average value and a correction value as the adjusted dynamic threshold of the touch point.

5. The data detection method according to claim 4, wherein the correction value is determined according to an empirical value, a variance, a standard deviation or a mean deviation.

6. The data detection method according to claim 3, wherein the average value comprises an arithmetic mean, a geometric mean or a harmonic mean.

7. The data detection method according to, claim 1 wherein the adjusting the dynamic threshold of the touch point according to the detection retention values, comprises:

determining a preset calculation number;

for each detection except the first one, calculating an average value of the detection retention value obtained in the current detection and an average value obtained from a previous calculation, until the number of the detection retention values to be calculated reaches the preset calculation number; and adjusting the dynamic threshold of the touch point according to the calculated average value.

8. The data detection method according to claim 7, wherein the adjusting the dynamic threshold of the touch point according to the calculated average value, comprises:

taking a sum of the calculated average value and a correction value as the adjusted dynamic threshold of the touch point.

9. The data detection method according to claim 1, wherein the adjusting the dynamic threshold of the touch point according to the detection retention values, comprises:

calculating a median of the detection retention values; and adjusting the dynamic threshold of the touch point according to the median.

10. The data detection method according to claim 9, wherein the adjusting the dynamic threshold of the touch point according to the median, comprises:

taking a sum of the median and a correction value as the adjusted dynamic threshold of the touch point.

11. The data detection method according to claim 1, wherein prior to collecting the plurality of initial detection values corresponding to a same touch point, the method further comprises:

setting an initial threshold as the dynamic threshold value of the touch point.

12. The data detection method according to claim 1, further comprising:

after adjusting the dynamic threshold of the touch point, comparing the initial detection value corresponding to the touch point which is collected subsequently with the adjusted dynamic threshold, and performing a touch detection according to a comparison result.

13. A storage medium on which non-transitory computer readable instructions are stored, the instructions are capable of being executed by a computer to implement the data detection method according to claim 1.

14. A data detection device, comprising:

a collection unit, configured to collect a plurality of initial detection values corresponding to a same touch point;

a comparison unit, configured to receive the plurality of initial detection values, compare the plurality of initial detection values with a dynamic threshold of the touch point, and retain the initial detection values which meet requirements as the detection retention values; and an adjustment unit, configured to be coupled with the comparison unit, and adjust the dynamic threshold of the touch point according to the detection retention values.

15. A touch device, comprising the data detection device according to claim 14.

16. The touch device according to claim 15, further comprising a touch screen, wherein the touch screen comprises a plurality of touch points and is coupled with the data detection device which adjusts the dynamic threshold of each touch point.

17. A data detection device, comprising:

a processor;

a memory; and one or more computer programs stored in the memory and executed by the processor, wherein the programs are executed by the processor to implement:

collecting a plurality of initial detection values corresponding to a same touch point;

comparing the plurality of initial detection values with a dynamic threshold of the touch point, and retaining the initial detection values which meet requirements as detection retention values; and adjusting the dynamic threshold of the touch point according to the detection retention values, wherein the adjusted dynamic threshold is used for comparing with the initial detection value corresponding to the touch point which is collected subsequently.

18. The data detection device according to claim 17, wherein the comparing the plurality of initial detection values with the dynamic threshold of the touch point, and retaining the initial detection values which meet the requirements as the detection retention values, comprises:

determining the number of samples; and comparing the initial detection values with the dynamic threshold of the touch point, retaining and storing the initial detection values which meet the requirements as the detection retention values until the number of the detection retention values reaches the number of the samples.

19. The data detection device according to claim 17, wherein the adjusting the dynamic threshold of the touch point according to the detection retention values, comprises:
- calculating an average value of the plurality of detection retention values; and
- adjusting the dynamic threshold of the touch point according to the average value.

20. The data detection device according to claim 17, wherein the adjusting the dynamic threshold of the touch point according to the detection retention values, comprises:
- determining a preset calculation number;
- for each detection except the first one, calculating an average value of the detection retention value obtained in the current detection and an average value obtained from a previous calculation, until the number of the detection retention values to be calculated reaches the preset calculation number; and
- adjusting the dynamic threshold of the touch point according to the calculated average value.

* * * * *